(12) United States Patent
Uejima

(10) Patent No.: US 10,571,019 B2
(45) Date of Patent: Feb. 25, 2020

(54) CONTROL SYSTEM FOR VEHICLE

(71) Applicant: TOYOTA JIDOSHA KABUSHIKI KAISHA, Toyota-shi, Aichi-ken (JP)

(72) Inventor: Taiyo Uejima, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 282 days.

(21) Appl. No.: 15/622,442

(22) Filed: Jun. 14, 2017

(65) Prior Publication Data

US 2017/0370467 A1 Dec. 28, 2017

(30) Foreign Application Priority Data

Jun. 22, 2016 (JP) ................................. 2016-124012

(51) Int. Cl.
*F16H 61/18* (2006.01)
*F16H 59/10* (2006.01)
*F16H 61/21* (2006.01)
*F16H 59/02* (2006.01)

(52) U.S. Cl.
CPC ........... *F16H 61/18* (2013.01); *F16H 59/105* (2013.01); *F16H 61/21* (2013.01); *F16H 59/0204* (2013.01); *F16H 2059/0221* (2013.01); *F16H 2059/0295* (2013.01)

(58) Field of Classification Search
CPC ......... F16H 59/0204; F16H 2059/0221; F16H 2059/0295; F16H 61/12; F16H 61/16; F16H 61/18; F16H 61/21
See application file for complete search history.

(56) References Cited

U.S. PATENT DOCUMENTS

| 4,648,290 | A | * | 3/1987 | Dunkley | ............... | B60W 10/06 |
|---|---|---|---|---|---|---|
| | | | | | | 340/456 |
| 4,928,227 | A | * | 5/1990 | Burba | ....................... | B60L 7/14 |
| | | | | | | 701/66 |
| 6,849,029 | B2 | * | 2/2005 | Loeffler | .................... | B60L 7/00 |
| | | | | | | 477/107 |
| 7,094,177 | B2 | * | 8/2006 | Inoue | .................... | F16H 59/105 |
| | | | | | | 340/456 |
| 8,620,542 | B2 | * | 12/2013 | Ueno | .................... | F16H 59/105 |
| | | | | | | 701/55 |
| 9,169,923 | B2 | * | 10/2015 | Knisely | ............... | F16H 61/0213 |
| 9,410,616 | B2 | * | 8/2016 | Shibata | ............... | F16H 59/0204 |

(Continued)

FOREIGN PATENT DOCUMENTS

| JP | 2005-007993 A | 1/2005 |
|---|---|---|
| JP | 2010-127419 A | 6/2010 |

*Primary Examiner* — David R Morris
(74) *Attorney, Agent, or Firm* — Oliff PLC

(57) ABSTRACT

In an electronic control unit, a traveling mode switching control unit switches a traveling mode from an N mode to a B mode when a shift lever is operated to a B operation position while the traveling mode is the N mode and the vehicle is traveling forward. Accordingly, during forward coast traveling in the N mode, the traveling mode is switched from the N mode to the B mode by an operation in one direction of the shift lever to a B operation position without requiring operations in two directions of the shift lever to a D operation position. Accordingly, it is possible to prevent a driver from experiencing difficulty in operating the shift lever at the time of switching the traveling mode from the N mode to the B mode during forward coast traveling in the N mode.

5 Claims, 8 Drawing Sheets

(56) References Cited

U.S. PATENT DOCUMENTS

| | | | |
|---|---|---|---|
| 9,927,025 B2* | 3/2018 | Song | F16H 59/0204 |
| 2003/0119626 A1* | 6/2003 | Loeffler | B60L 7/00 |
| | | | 477/34 |
| 2004/0259685 A1 | 12/2004 | Inoue et al. | |
| 2012/0016559 A1* | 1/2012 | Ueno | F16H 59/105 |
| | | | 701/55 |
| 2016/0153547 A1* | 6/2016 | Shibata | F16H 59/105 |
| | | | 701/51 |
| 2017/0138464 A1* | 5/2017 | Shine | F16H 59/0204 |
| 2017/0167604 A1* | 6/2017 | Song | F16H 59/0204 |

* cited by examiner

CONTROL SYSTEM FOR VEHICLE

CROSS-REFERENCE TO RELATED APPLICATIONS

This application claims priority to Japanese Patent Application No. 2016-124012 filed on Jun. 22, 2016, the entire contents of which are hereby incorporated by reference.

BACKGROUND

1. Technical Field

The disclosure relates to a technique for preventing a driver from experiencing difficulty in operating an operating member at the time of switching a neutral mode to a second forward traveling mode while a vehicle having an automatic return type shift operating device is forward coasting in the neutral mode.

2. Description of Related Art

A controller for a vehicle including an automatic return type shift operating device which includes an operating member operated by a driver and in which a first forward traveling operation position can be selected by a predetermined operation of the operating member and a second forward traveling operation position can be selected by an operation other than the operation to the first forward traveling operation position is known. An example of the controller for a vehicle is disclosed in Japanese Patent Application Publication No. 2005-7993 (JP 2005-7993 A). In the shift operating device included in the vehicle disclosed in JP 2005-7993 A, a forward traveling operation position for switching to a forward traveling position, a reverse traveling operation position for switching to a reverse traveling position, and a neutral operation position for switching to a neutral position in which a power transmission path of an automatic transmission is intercepted are arranged in a line such that the neutral operation position is located between the forward traveling operation position and the reverse traveling operation position. An initial position (a home position) and a deceleration traveling operation position for switching to a deceleration traveling position are arranged parallel to the forward traveling operation position, the reverse traveling operation position, and the neutral operation position which are arranged in a line. The operating member can move between the forward traveling operation position, the reverse traveling operation position, and the neutral operation position. The operating member can move between the initial position and the deceleration traveling operation position and can move between the initial position and the neutral operation position. The shift operating device is of a momentary type in which the operating member is automatically returned to the initial position in a state in which an external force is not applied thereto. The forward traveling position, the deceleration traveling position, and the neutral position correspond to a first forward traveling mode, a second forward traveling mode, and a neutral mode in the disclosure. The forward traveling operation position and the deceleration traveling operation position are examples of a first forward traveling operation position and a second forward traveling operation position in the disclosure.

SUMMARY

In the shift operating device disclosed in JP 2005-7993 A, in order to prevent the vehicle from being started unintentionally by an erroneous operation of the operating member due to a touch of a hand on the operating member or the like, two types of operation of an operation of the operating member from the initial position to the neutral operation position and an operation of the operating member from the neutral operation position to the first forward traveling operation position or the reverse traveling operation position are required for switching from a non-driving mode including the neutral mode (an N mode) and a parking mode to the first forward traveling mode or the reverse traveling mode. In the parking mode, the power transmission path of the automatic transmission is intercepted and rotation of driving wheels is mechanically locked. For the same reason, it is conceivable that switching from the non-driving mode to the second forward traveling mode is not permitted by only one type of operation of the operating member from the initial position to the second forward traveling operation position.

In this case, regarding, switching from the non-driving mode to the second forward traveling mode, after an operation of the operating member from the initial position to the first forward traveling operation position is first performed, the traveling mode is temporarily switched to the first forward traveling mode and then switching to the second forward traveling mode is permitted by an operation of the operating member from the initial position to the second forward traveling, operation position. The switching from the non-driving mode to the second forward traveling mode requires a total of three types of operation of two types of operation of the operation of the operating member from the initial position to the neutral operation position and the operation of the operating member from the neutral operation position to the first forward traveling operation position and one type of operation of the operating member from the initial position to the second forward traveling operation position. Accordingly, at the time of forward coast traveling in the neutral mode for the purpose of reduction of fuel consumption or the like, three types of operation of the operating member are required for switching to the second forward traveling mode for the purpose of acquisition of stronger deceleration than that in forward coast traveling. Accordingly, a driver may experience difficulty in operating the operating member. In a shift operating device additionally requiring a switching operation of switching a predetermined operating member to the second forward traveling mode after a switching operation of switching the operating member to the first forward traveling mode is performed as well as the shift operating device in which two types of operations are required for switching of the operating member to the first forward traveling operation position as described in JP 2005-7993 A, there is a possibility that a driver may experience difficulty in operating the operating member at the time of switching to the second forward traveling mode during forward coast traveling in the neutral mode.

The disclosure is made in consideration of the above mentioned circumstances and provides a control system for a vehicle including an electronic control unit that can prevent a driver from experiencing difficulty in operating an operating member at the time of switching from a neutral mode to a second forward traveling mode during forward coast traveling.

Therefore, according to a first aspect of the disclosure, there is provided control system for a vehicle including an operating member and a shift operating device. The operating member is configured to be operated by a driver of the vehicle. The shift operating device is configured to: (i) select a first forward traveling operation position by a predetermined operation of the operating member, the shift operating device being able to return automatically, and (ii) select a second forward traveling operation position by an operation other than the operation to the first forward traveling operation position. The control system is provided with an electronic control unit. The electronic control unit is configured to: (i) set a second forward traveling mode based on a selecting operation of the operating member selecting the second forward traveling operation position with the operating member when a first forward traveling, mode based on the operation of selecting the first forward traveling operation position with the operating member is set, (ii) determine whether the vehicle is traveling forward, (iii) determine whether a traveling mode of the vehicle is a neutral mode, and (iv) switch the traveling mode from the neutral mode to the second forward traveling mode when the selecting operation of the operating member selecting the second forward traveling operation position is performed while the traveling mode of the vehicle is the neutral mode and the vehicle is traveling forward.

According to the above-mentioned vehicle, the electronic control unit is configured to: (i) set the second forward traveling mode based on the selecting operation of the operating member selecting the second forward traveling operation position when the first forward traveling mode based on the selecting operation of the operating member selecting the first forward traveling operation position is set, (ii) determine whether the vehicle is traveling forward, (iii) determine whether the traveling mode of the vehicle is the neutral mode, and (iv) switch the traveling mode from the neutral mode to the second forward traveling mode when the selecting operation of the operating member selecting the second forward traveling operation position is performed while the traveling mode of the vehicle is the neutral mode and the vehicle is traveling forward. Accordingly, during forward coast traveling in the neutral mode, the traveling mode is switched from the neutral mode to the second forward traveling mode by only one type of selecting operation of the operating member selecting the second forward traveling operation position without the selecting operation of selecting the first forward traveling operation position with the operating member being performed. Accordingly, when a driver wants to switch the traveling mode to the second forward traveling mode during forward coast traveling in the neutral mode, it is possible to prevent the driver from experiencing difficulty in operating the operating member at the time of switching from the neutral mode to the second forward traveling mode.

In the control system for the vehicle, the operating member may be a shift lever. The shift operating device may be configured to: (i) operate the shift lever to the first forward traveling operation position for switching the traveling mode of the vehicle to the first forward traveling mode by a first operation in a first direction from an initial position and a second operation in a second direction different from the first direction, the second operation being an operation subsequent to the first operation; and (ii) operate the shift lever to the second forward traveling operation position for switching the traveling mode of the vehicle to the second forward traveling mode by the second operation in the second direction different from the first direction from the initial position.

According to the above-mentioned vehicle, the operating member may be the shift lever. The shift operating device may be configured to: (i) operate the shift lever to the first forward traveling operation position for switching the traveling mode of the vehicle to the first forward traveling mode by a first operation in a first direction from an initial position and a second operation in a second direction different from the first direction, the second operation being an operation subsequent to the first operation; and (ii) operate the shift lever to the second forward traveling operation position for switching the traveling mode of the vehicle to the second forward traveling mode by the second operation in the second direction different from the first direction from the initial position. Accordingly, when the traveling mode is the neutral mode and the vehicle is traveling forward, the traveling mode is switched from the neutral mode to the second forward traveling mode by one type of operation in one direction of the shift lever from the initial position to the second forward traveling operation position without requiring two types of operation in two directions of the shift lever to the first forward traveling operation position. Accordingly, it is possible to prevent the driver from experiencing difficulty in operating the shift lever at the time of switching from the neutral mode to the second forward traveling mode during forward coast traveling of the vehicle in the neutral mode.

In the vehicle, the electronic control unit may be configured to switch the traveling mode from the first forward traveling mode to the neutral mode when switching to a parking mode based on an operation of a parking switch during forward traveling of the vehicle is prohibited or when switching to a reverse traveling mode based on an operation of the shift lever to a reverse traveling operation position during forward traveling of the vehicle is prohibited.

According to the above-mentioned vehicle, the electronic control unit is configured to: switch the traveling mode from the first forward traveling mode to the neutral mode when switching to the parking mode based on the operation of the parking switch during forward traveling of the vehicle is prohibited or when switching to the reverse traveling mode based on the operation of the shift lever to the reverse traveling operation position during forward traveling of the vehicle is prohibited. Accordingly, during forward traveling of the vehicle when the operation of the parking switch or the operation of the shift lever to the reverse traveling operation position is a driver's erroneous operation and the traveling mode is switched from the first forward traveling mode to the neutral mode by the erroneous operation, the traveling mode may also be switched from the neutral mode to a driving triode in which power is transmitted from a drive source to driving wheels by one type of operation in one direction of the shift lever to the second forward traveling operation position, similarly to the operation of the shift lever to the first forward traveling operation position requiring two types of operation in two directions. Accordingly, it is possible to simplify an operation of returning the traveling mode from the neutral mode to the driving mode with the operating member and to return the traveling mode from the non-driving mode to the driving mode sooner.

In the vehicle, the electronic control unit may be configured to: (i) switch the traveling mode from the first forward traveling mode to the neutral mode when the electronic control unit determines that a vehicle driving control system is abnormal during forward traveling of the vehicle; and (ii) switch the traveling mode from the neutral mode to the second forward traveling mode on an assumption that the shift lever is operated to the second forward traveling operation position when the electronic control unit determines that the vehicle driving control system has been returned to a normal state while the vehicle is traveling forward in the neutral mode to which the traveling mode has been switched due to the abnormality of the vehicle driving control system.

According to the above-mentioned vehicle, the electronic control unit may be configured to: (i) switch the traveling mode from the first forward traveling mode to the neutral mode when the electronic control unit determines that the vehicle driving control system is abnormal during forward traveling of the vehicle; and (ii) switch the traveling mode from the neutral mode to the second forward traveling mode on the assumption that the shift lever is operated to the second forward traveling operation position when the electronic control unit determines that the vehicle driving control system has been returned to a normal state while the vehicle is traveling forward in the neutral mode to which the traveling mode has been switched due to the abnormality of the vehicle driving control system. Accordingly, during forward traveling of the vehicle when the traveling mode is switched from the first forward traveling mode to the neutral mode due to abnormality of the vehicle driving control system, when the vehicle driving control system is returned to the normal state, the traveling mode is also switched from the neutral mode to a driving mode in which power is transmitted from a drive source to driving wheels by one type of operation in one direction of the shift lever to the second forward traveling operation position, similarly to the operation of the shift lever to the first forward traveling operation position requiring two types of operation in two directions. Accordingly, it is possible to simplify a returning operation of the operating member from the neutral mode to the driving mode and to early return the traveling mode from the non-driving mode to the driving mode.

In the vehicle, the electronic control unit may be configured to: (i) switch the traveling mode to the neutral mode regardless of traveling of the vehicle when the shift lever is maintained at a neutral operation position for a first neutral operation position recognition time or more; and (ii) switch the traveling mode from the first forward traveling mode to the neutral mode when the shift lever is operated from the initial position to the neutral operation position during forward traveling of the vehicle, is maintained at the neutral operation position for a second neutral operation position recognition time which is shorter than the first neutral operation position recognition time, and then the shift lever is operated to the initial position.

According to the above-mentioned vehicle, the electronic control unit may be configured to: (i) switch the traveling mode to the neutral mode regardless of traveling of the vehicle when the shift lever is maintained at a neutral operation position for a first neutral operation position recognition time or more; and (ii) switch the traveling mode from the first forward traveling mode to the neutral mode when the shift lever is operated from the initial position to the neutral operation position during forward traveling of the vehicle, is maintained at the neutral operation position for a second neutral operation position recognition time which is shorter than the first neutral operation position recognition time, and is then operated to the initial position. Accordingly, during forward traveling of the vehicle when the operation of maintaining the shift lever for the second neutral operation position recognition time is a driver's erroneous operation and the traveling mode is switched from the first forward traveling mode to the neutral mode by the erroneous operation of the shift lever, the traveling mode is also switched from the neutral mode to a driving mode in which power is transmitted from a drive source to driving wheels by one type of operation in one direction of the shift lever to the second forward traveling operation position, similarly to the operation of the shift lever to the first forward traveling operation position requiring two types of operation in two directions. Accordingly, it is possible to simplify a returning operation of the operating member from the neutral mode to the driving mode and to early return the traveling mode from the non-driving mode to the driving mode.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, embodiments of a controller for a vehicle according to the disclosure will be described in detail with reference to the accompanying drawings.

Figure 1:
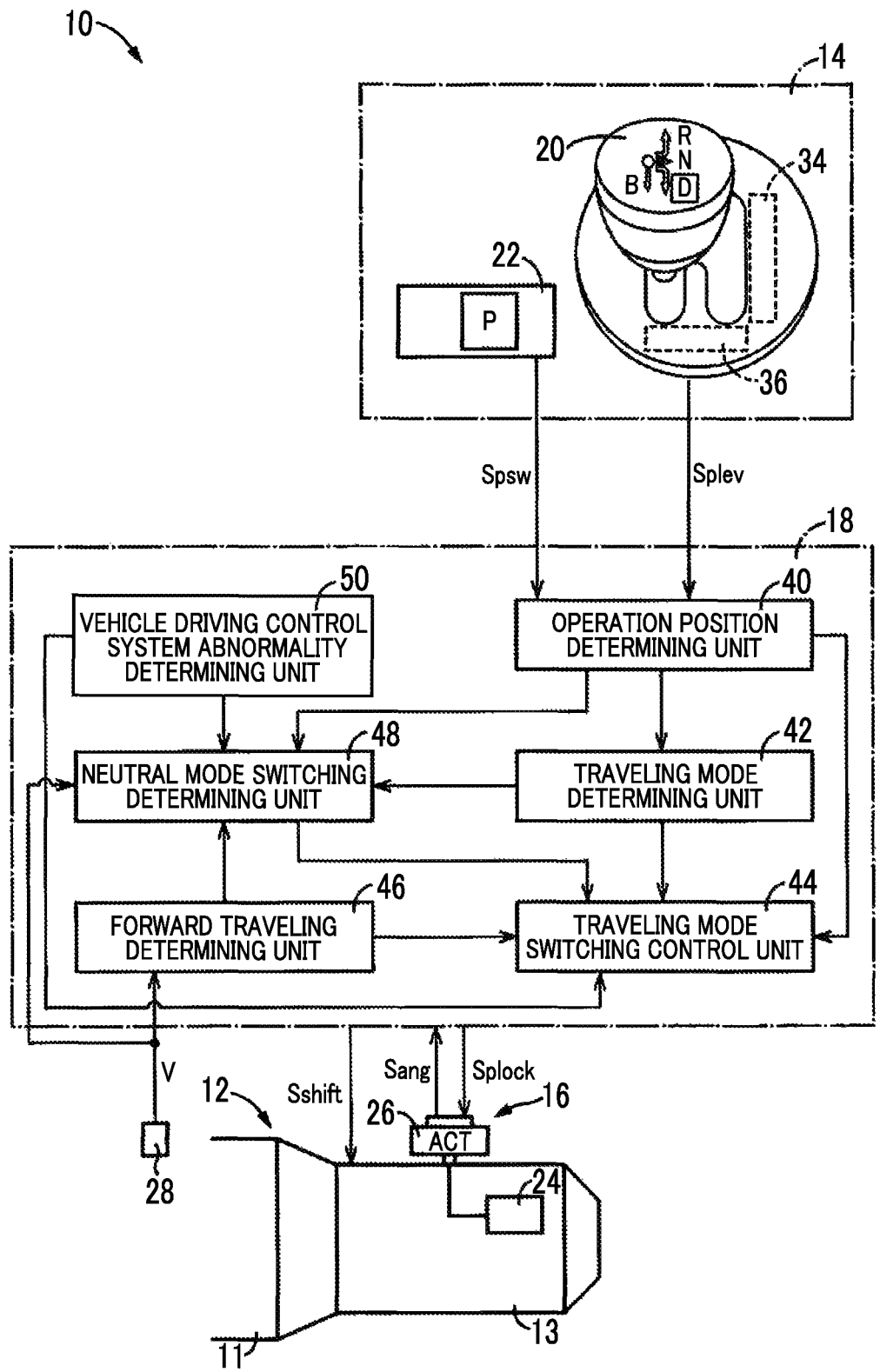
FIG. 1 is a block diagram illustrating a control system disposed in a vehicle to control a drive unit, a switching mechanism, and a traveling mode of an automatic transmission constituting the vehicle according to an embodiment of the disclosure and principal parts of a control function of an electronic control unit included in the control system.

FIG. 1 is a block diagram illustrating principal parts of a control system disposed in a vehicle 10 to control a drive unit 12, a switching mechanism 16, and a traveling mode of an automatic transmission 13 constituting the vehicle 10 to which a controller for a vehicle according to a first embodiment of the disclosure is applied and principal parts of a control function of an electronic control unit 18 included in the control system. In FIG. 1, the vehicle 10 includes a drive unit 12, a shift operating device 14, a switching mechanism 16, and an electronic control unit 18. The drive unit 12 according to the first embodiment is suitably used, for example, for a front engine-rear drive (FR) type vehicle in which an engine and a drive unit are longitudinally arranged in the vehicle 10, and includes an engine 11 which is an internal combustion engine as a traveling driving force source and an automatic transmission 13. The automatic transmission 13 transmits power of the engine 11 from an output shaft thereof to a pair of driving wheels via a differential gear mechanism which is not illustrated and an axle which is not illustrated between the differential gear mechanism and the pair of driving wheels. The vehicle 10 employs a shift-by-wire (SBW) system in which a traveling mode of the automatic transmission 13 is switched by electric control.

The vehicle 10 is provided with an electronic control unit 18 including a controller for the vehicle 10 that controls an operating state of the switching mechanism 16, switching of a traveling mode (a shift position) of the automatic transmission 13, and the like. The electronic control unit 18 is configured to include, for example, a so-called microcomputer including a CPU, a RAM, a ROM, and an input/output interface. The CPU implements various control operations of the vehicle 10 by performing signal processing in accordance with a program stored in the ROM in advance using a temporary storage function of the RAM. For example, the electronic control unit 18 is configured to perform vehicle control such as output control of the engine 11, shift control of the automatic transmission 13, control of switching the traveling mode of the automatic transmission 13 using the SBW system, and control of switching the operating state of the switching mechanism 16. If necessary, the electronic control unit is divided into a control unit for the output control of the engine 11, a control unit for the shift control of the automatic transmission 13, and the like. Various signals detected by various sensors disposed in the vehicle 10 are supplied to the electronic control unit 18. Examples of various sensors include a shift sensor 34 and a selection sensor 36 which is an operation position sensor of a shift lever 20, a P switch 22, and a rotary encoder. Examples of various signals include a shift lever position signal Splev, a P switch signal Spsw, a rotation signal Sang, and a vehicle speed V and a traveling direction of the vehicle 10. The shift lever position signal Splev is an operation signal (a sensor signal) corresponding to an operation position (a lever position) Plev of the shift lever 20 when the shift lever 20 is operated by a driver. The P switch signal Spsw is an operation signal corresponding to an operation position (a P switch ON position) Psw when the P switch 22 is operated by the driver. The rotation signal Sang is a signal indicating a rotation angle of a P lock drive motor 26 (see FIG. 1) as a position signal in the switching mechanism 16. The vehicle speed V of the vehicle 10 is detected by a vehicle speed sensor 28. Various output signals are supplied from the electronic control unit 18 to various units disposed in the vehicle 10. Examples of various units include the engine 11, the switching mechanism 16, and the automatic transmission 13. Examples of various output signals include an engine output control command signal for the output control of the engine 11, a P switching control command signal Splock for the switching control of the switching mechanism 16, and a traveling mode switching control command signal Sshift for switching the traveling mode of the automatic transmission 13.

FIG. 1 illustrates an example of the shift operating device 14 that allows switching between a plurality of types of traveling modes in the automatic transmission 13 by a manual operation. The shift operating device 14 is disposed, for example, in the vicinity of a driver seat and includes a shift lever 20 and a P switch 22 (a parking switch 22). The shift lever 20 is of a momentary type in which the shift lever is returned to an initial position (an original position, a home position) in a state in which an external force is not applied thereto, and is an operating member which is selectively operated to a plurality of shift operation positions (lever positions Plev) corresponding to a plurality of traveling modes of the automatic transmission 13 by a driver. The momentary type refers to an automatic return type in which the shift lever is automatically returned to the initial position when an operating force is released. In order to switch the traveling mode of the vehicle 10 to a desired traveling mode (a reverse mode (an R mode), a neutral mode (an N mode), a drive motor (a D mode), and an engine brake mode (a B mode)) other than a parking mode (a P mode), the shift lever 20 is alternately and selectively operated to a plurality of lever positions Plev, that is, a reverse operation position (an R operation position), a neutral operation position (an N operation position), a drive operation position D operation position), and an engine brake operation position (a B operation position) by a driver. The P switch 22 is disposed as an independent switch in the vicinity of the shift lever 20. The P switch 22 is operated by a driver for the purpose of parking lock by setting the traveling mode of the vehicle 100 to the parking mode. In this way, the shift operating device 14 is a momentary type (automatic return type) operating device in which the shift lever 20 is automatically returned to the initial position (the home position) in a state in which an external force is not applied thereto.

Figure 2:
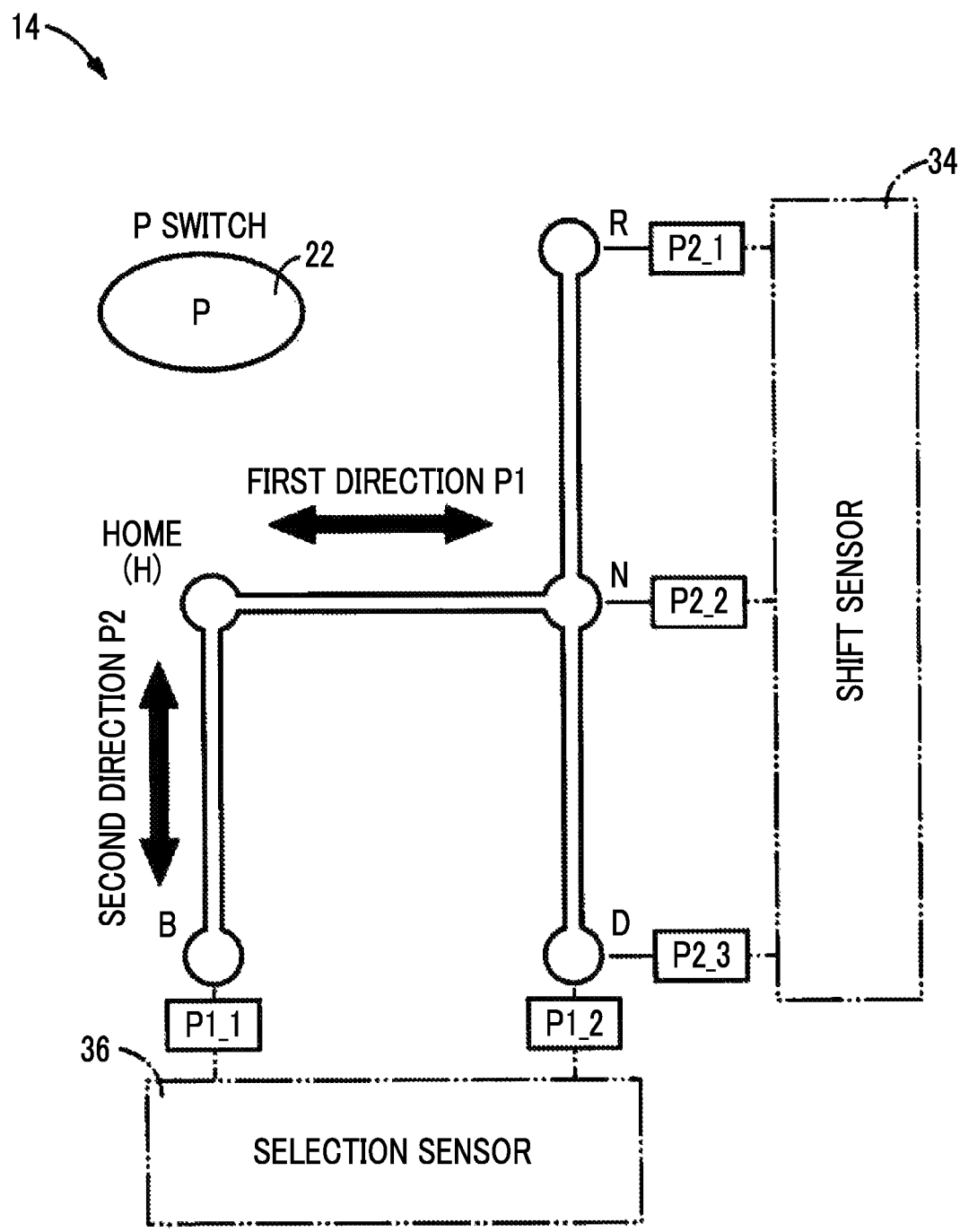
FIG. 2 is a diagram illustrating operation positions of a shift lever of a shift operating device included in the control system illustrated in FIG. 1, operation paths between the operation positions, and a P switch.

FIG. 2 is a diagram illustrating operation positions of the shift lever 20 of the shift operating device 14, operation paths between the operation positions, and the P switch 22. As illustrated in FIG. 2, the shift lever 20 are operated to three lever positions Plev of an R operation position (an R operation position, a reverse operation position), an N operation position (an N operation, a neutral operation position), and a D operation position (a D operation position, a drive operation position) arranged in a front-rear direction or an up-down direction (that is, a longitudinal direction) of the vehicle 10 and an H position (an H position, a home position) and a B operation position (a B operation position, an engine brake operation position) arranged in parallel thereto. The shift lever can be operated in the longitudinal direction of the vehicle 10 between the R operation position, the N operation position, and the D operation position, can be operated in the longitudinal direction between the H position and the B operation position, and can be operated in a transverse direction of the vehicle 10 perpendicular to the longitudinal direction between the H position and the N operation position. The H position is an initial position of the shift lever 20, and when the shift lever 20 is operated to a lever position Plev (the R, N, D, and B operation positions) other than the H position and an external force applied to the shift lever 20 disappears (that is, when a driver releases the shift lever 20), the shift lever 20 is returned to the H position by a mechanical mechanism such as a spring.

Accordingly, the shift lever 20 can select the D operation position for switching the traveling mode to the D mode by a predetermined operation, that is, two types (two actions) of operations of an operation in a first direction P1 from the H position and an operation to the rear side of the vehicle in a second direction P2 different from the first direction P1 subsequent thereto, can select the R operation position for switching the traveling mode to the R mode by two types of operation of an operation in the first direction P1 from the H position and an operation to the front side of the vehicle in the second direction P2 different from the first direction P1 subsequent thereto. The shift lever 20 can select the N operation position for switching the traveling mode to the N mode by the operation in the first direction P1 from the H position. The shift lever 20 can select the B operation position for switching the traveling mode to the B mode by an operation different from the operation to the D operation position, that is, one type of operation to the rear side of the vehicle in the second direction P2 different from the first direction P1 from the H position. The B operation position is an example of the second forward traveling operation position in the disclosure.

The P switch 22 is, for example, an automatic return type push button switch and outputs a P switch signal Spsw (also referred to as a P operation signal Ppos) to the electronic control unit 18 when the P switch 22 is operated to a P operation position (a P operation position, a parking operation position) which is a P switch ON position Psw by a driver's operation.

When the shift operating device 14 is operated to each operation position, the shift operating device 14 is electrically switched to the traveling mode of the automatic transmission 13 corresponding to the operation position based on the operation signal corresponding to the operation position by the electronic control unit 18, and the traveling mode of the automatic transmission 13 is displayed on an indicator which is not illustrated.

The traveling modes (the R R, N, D, and B modes) of the automatic transmission 13 (the vehicle 10) will be described below. The P mode to which the traveling mode is switched based on the P operation position of the P switch 22 is a mode in which a power transmission path in the automatic transmission 13 is intercepted. The P mode is a parking mode indicating a control state in which a parking lock (a P lock) of mechanically prohibiting rotation of the driving wheels using the switching mechanism 16 is performed. The R mode to which the traveling mode is switched based on the operation to the R operation position of the shift lever 20 is a reverse traveling mode (that is, a reverse traveling mode in which the vehicle 10 travels reversely) indicating a control state in which a driving force for causing the vehicle 10 to travel reversely is transmitted to the driving wheels. The neutral mode (the N mode) to which the traveling mode is switched based on the operation to the N operation position of the shift lever 20 is a neutral mode indicating a control state for transitioning to a neutral state in which the power transmission path in the automatic transmission 13 is intercepted. The D mode which is selected based on the operation of the shift lever 20 to the D operation position is a forward traveling mode indicating a control state in which a driving force for causing the vehicle 10 to traveling forward is transmitted to the driving wheels. That is, the D mode is a forward traveling mode in which the vehicle 10 travels forward. The engine brake mode (the B mode) which is selected based on the operation of the shift lever 20 to the B operation position is a deceleration forward traveling mode (a deceleration traveling mode) indicating a control state in which an engine brake effect is activated to decelerate the vehicle 10 when an accelerator is turned off during forward traveling. The deceleration traveling mode is an example of the second forward traveling mode in the disclosure. The D mode is an example of the first forward traveling mode in the disclosure. The D operation position, the N operation position, and the R operation position are examples of the first forward traveling operation position, the neutral operation position, and the reverse traveling operation position in the disclosure.

The vehicle 10 according to the first embodiment employs a so-called shift-by-wire system. As illustrated in FIG. 2, the shift lever 20 is two-dimensionally operated in the first direction P1 which is the transverse direction and the second direction P2 which is the longitudinal direction intersecting (that is, perpendicular to) the direction. Accordingly, the shift operating device 14 functions as a position sensor for detecting the lever position Plev of the shift lever 20. The shift operating device 14 includes a shift sensor 34 that detects an operation in the second direction P2 and a selection sensor 36 that detects an operation in the first direction P1. The shift sensor 34 and the selection sensor 36 output shift lever position signals Splev (voltages) corresponding to the lever position Plev to the electronic control unit 18. That is, the shift sensor 34 and the selection sensor 36 constitute a lever position sensor that detects the lever position Plev of the shift lever 20. The electronic control unit 1 recognizes (determines) the lever position Plev based on a combination of the shift lever position signals Splev (voltages).

In FIG. 1, the switching mechanism 16 includes a P lock mechanism 24, a P lock drive motor 26, and a rotary encoder. The switching mechanism 16 activates the P lock drive motor 26 based on the P switching control command signal Splock to switch the P lock mechanism 24 between a parking locked state and a non-parking locked state. The parking locked state is a state in which rotation of the driving wheels is locked by engagement of a parking gear and a parking lock pole disposed in the output shaft of the automatic transmission 13. The non-parking locked state is a parking unlocked state in which the parking gear and the parking lock pole are disengaged with each other. Accordingly, the switching mechanism 16 prohibits movement of the vehicle 10 or permits movement of the vehicle 10 based on the P switching control command signal Splock.

Principal parts of the control function of the electronic control unit 18 are illustrated in FIG. 1. In FIG. 1, the electronic control unit 18 includes an operation position determining unit 40, a traveling mode determining unit 42, a traveling mode switching control unit 44, a forward traveling determining unit 46, a neutral mode switching determining unit 48, and a vehicle driving control system abnormality determining unit 50. The electronic control unit 18 is an example of a controller of a vehicle of the disclosure.

The operation position determining unit 40 determines the operation position of the shift lever 20, for example, based on the shift lever position signal Splev. Specifically, the operation position determining unit 40 determines the operation position of the shift lever 20 based on the shift lever position signal Splev and determines whether the shift lever 20 is switched to a predetermined operation position. The operation position determining unit 40 determines whether the shift lever 20 is switched from the predetermined operation position to the H position or another operation position. When it is determined that the shift lever is switched to the predetermined operation position, the operation position determining unit 40 counts (counts up) a time in which a sensor signal is continuously output based on the sensor signal corresponding to the predetermined operation position and determines whether the sensor signal is continuously output for a predetermined operation position recognition time T which is set in advance or more (that is, the shift lever 20 is maintained at the predetermined operation position for the predetermined operation position recognition time T or more). The predetermined operation position corresponds to, for example, the N operation position, the R operation position, the D operation position, and the B operation position. The predetermined operation position recognition time T is an operation position determination threshold value which is experimentally calculated and stored in advance (determined in advance), for example, as a time in which the shift lever 20 can be determined to be surely maintained at a predetermined operation position by a driver's intention. The predetermined operation position recognition time T may be set to a constant value for the operation positions or may be set to different values depending on the operation positions. The predetermined operation position recognition time T at the N operation position is set to a first N operation position recognition time Tn1 and a second N operation position recognition time Tn2 shorter than the first N operation position recognition time Tn1 as will be described later. When it is determined that a sensor signal corresponding to a predetermined operation position is continuously output for the predetermined operation position recognition time T or more, the operation position determining unit 40 sets a switching request to a predetermined traveling mode of the automatic transmission 13 corresponding to the predetermined operation position, for example, a traveling mode switch request signal, to an ON state. When it is determined that a P switch signal Spsw corresponding to the operation position of a P switch ON position Psw is continuously output for a predetermined operation position recognition time Tp1 or more, the operation position determining unit 40 sets a switching request to the P mode, for example, a P mode switching request signal Preq, to an ON state.

The traveling mode determining unit 42 determines whether the P lock mechanism 24 is in the parking locked state, that is, whether the traveling mode of the vehicle 10 is the P mode or a non-P mode (the R, N, D, or B mode), based on a rotation signal Sang of the P lock drive motor 26. The traveling mode determining unit 42 determines which traveling mode (which of the P, R, N, D, or B modes) the traveling mode of the vehicle 10 is. Accordingly, the traveling mode determining unit 42 determines whether the traveling mode of the vehicle is the neutral mode and determines whether the traveling mode of the vehicle is the forward traveling mode.

The traveling mode switching control unit 44 electrically switches the traveling mode of the vehicle 10 and the automatic transmission 13, for example, based on a switching request to a predetermined traveling mode (for example, a traveling mode switching request signal in an ON state) set by the operation position determining unit 40. Specifically, for example, when the traveling mode is the P mode and a switching request to any one of the non-P modes (the R, N, D modes herein; a reject function of maintaining the P mode even when a B mode switching request signal Breq is set to an ON state in the P mode) is issued by the operation position determining unit 40, the traveling mode switching control unit 44 switches the traveling mode of the vehicle 10 from the P mode to the non-P mode by activating the switching mechanism 16 to switch the parking gear to an unlocked state in response to the switching request. For example, when any one of an R mode switching request signal Rreq, an N mode switching request signal Nreq, and a D mode switching request signal Dreg is set to an ON state, the traveling mode switching control unit 44 switches the traveling mode by additionally outputting the traveling mode switching control signal Sshift corresponding to any one of the R mode, the N inside, and the D mode corresponding to the traveling mode switching request signal to the automatic transmission 13.

When the traveling mode determining unit 42 determines that the traveling mode is the D mode or the N mode and the B mode switching request signal Breq based on the operation of the shift lever 20 to the B operation position is set to the ON state, the traveling mode switching control unit 44 switches the traveling mode of the automatic transmission 13 to the B mode. The case in which the traveling mode is the N mode is limited to a case in which the vehicle 10 is traveling forward as will be described later.

The forward traveling determining unit 46 determines whether the vehicle 10 is traveling forward based on a signal indicating the vehicle speed V detected by the vehicle speed sensor 28 and the traveling direction of the vehicle 10.

When a normal operation of the shift lever 20 in which the shift lever 20 is maintained at the N operation position for the first N operation position recognition time Tn1 which is set to, for example, about 500 ms or more is performed, the operation position determining unit 40 sets the N mode switching request signal Nreq indicating a normal switching request to the N mode to an ON state.

When the shift lever 20 is operated from the H position to the N operation position while the vehicle 10 is traveling forward, is maintained at the operation position for the second N operation position recognition time Tn2 (for example, a time which is set to be equal to or greater than 100 ms and less than 500 ms), and is then returned from the N operation position to the H position, the operation position determining unit 40 sets the switching request to the N mode, for example, the N mode switching request signal Nreq to an ON state. The second N operation position recognition time Tn2 is a period of time which is shorter than the first N operation position recognition time Tn1 (for example, 500 ms) which is an operation position determination threshold value of the N operation position.

When the N mode switching request signal Nreq is set to the ON state by the operation position determining unit 40 based on the normal operation of maintaining the shift lever 20 at the N operation position for the first N operation position recognition time Tn1 or more or the operation of maintaining the shift lever 20 at the N operation position for the second N operation position recognition time Tn2, the neutral mode switching determining unit 48 determines that the traveling mode is switched from the D mode to the N mode. That is, when the normal operation of maintaining the shift lever 20 at the N operation position for the first N operation position recognition time Tn1 or more is not performed but following operations (i), (ii), and (iii) are performed, the neutral mode switching determining unit 48 determines that the traveling mode is switched from the D mode to the N mode. (i) The traveling mode is the D mode, (ii) the shift lever 20 is operated from the H position to the N operation position during forward traveling of the vehicle 10, and (iii) a single operation of the shift lever 20 to the N operation position which is an operation of returning the shift lever 20 to the H position without passing through the D operation position or the R operation position is performed after the shift lever 20 is maintained at the N operation position for the second N operation position recognition time Tn2.

It is assumed that the traveling mode is, for example, the D mode. When the vehicle speed V is higher than a P lock permitting vehicle speed Vp and the P mode switching request signal Preq is set to the ON state by the operation position determining unit 40 based on the operation of the P switch 22 of switching the shift operating device 14 to the P operation position while the vehicle 10 is traveling forward, the neutral mode switching determining unit 48 prohibits (rejects) switching to the P mode based on the P mode switching request signal Preq set to the ON state. The neutral mode switching determining unit 48 determines that the traveling mode is switched from the D mode to the N mode in this way. Here, the P lock permitting vehicle speed Vp is an upper limit value of the vehicle speed V at which switching of the P lock mechanism 24 to the parking locked state is permitted by switching to the P mode and is experimentally determined in advance.

It is assumed that the traveling mode is, for example, the D mode. When the vehicle speed V is higher than an R switching permitting vehicle speed Vr and the R mode switching request signal Rreq is set to the ON state based on the operation of maintaining the shift lever 20 at the R operation position for the predetermined operation position recognition time T or more while the vehicle 10 is traveling forward, the neutral mode switching determining unit 48 prohibits (rejects) switching to the R mode based on the R mode switching request signal Rreq set to the ON state. The neutral mode switching determining unit 48 determines that the traveling mode is switched from the D mode to the N mode in this way. Here, the R switching permitting vehicle speed Vr is an upper limit value of the vehicle speed V at which switching to the R mode is permitted while the vehicle 10 is traveling forward, and is experimentally determined in advance.

The vehicle driving control system abnormality determining unit 50 determines whether a vehicle driving control system is abnormal (fails, malfunctions). Here, the abnormality of the vehicle driving control system is an abnormality such as following abnormalities (i), (ii), and (iii). (i) The shift sensor 34 and/or the selection sensor 36 is abnormal, (ii) the electronic control unit 18 (ECU) that determines the operation position of the shift lever 20 based on the shift lever position signals Splev from the shift sensor 34 and the selection sensor 36 and that performs switching of the traveling mode from the operation position is abnormal, for example, the electronic control unit 18 is reset (ECU reset), (iii) a wire harness (W/H) that is disposed between the shift sensor 34 and the selection sensor 36 and the electronic control unit 18 and that transmits the shift lever switch signals Splev from the shift sensor 34 and the selection sensor 36 to the electronic control unit 18 is abnormal. The vehicle driving control system abnormality determining unit 50 determines whether the vehicle driving control system is returned to a normal state after it is determined that the vehicle driving control system is abnormal.

When the traveling mode is the D mode and the vehicle driving control system abnormality determining unit 50 determines that the vehicle driving control system is abnormal while the vehicle 10 is traveling forward, the neutral mode switching determining unit 48 determines that the traveling mode is switched from to D mode to the N mode depending on an abnormality type or the like.

When the neutral mode switching determining unit 48 determines that the traveling is switched from the D mode to the N mode while the vehicle 10 is traveling forward, the traveling mode switching control unit 44 switches the traveling mode form the D mode to the N mode by outputting the traveling mode switching command signal Sshift. The traveling mode switching control unit 44 switches a traveling state to forward coast traveling in the N mode while the vehicle 10 is traveling forward, for example, due to a driver's normal operation of the shift lever 20 to the N operation position, a single operation of the shift lever 20 to the N operation position during traveling forward, an erroneous operation of the shift lever 20 to the R operation position during traveling forward, an erroneous operation of the P switch 22 during traveling forward, an abnormality of the vehicle driving control system during traveling forward, and the like.

When the shift lever 20 is operated from the H position to the B operation position while the vehicle 10 is traveling forward in the N mode, the traveling mode switching control unit 44 switches the traveling mode from the N mode to the B mode. Specifically, when the B mode switching request signal Breq is set to the ON state by the operation position determining unit 40 based on the operation of maintaining the shift lever 20 at the B operation position for the predetermined operation position recognition time T or more, the traveling mode determining unit 42 determines that the traveling mode is the N mode, and the forward traveling determining unit 46 determines that the vehicle 10 is traveling forward, the traveling mode switching control unit 44 switches the traveling mode of the automatic transmission 13 form the N mode to the B mode.

When the vehicle driving control system abnormality determining unit 50 determines that the vehicle driving control system is returned to the normal state while the vehicle 10 is traveling forward in the N mode to which the traveling mode has been switched from the D mode based on the determination result that the vehicle driving control system is abnormal, the traveling mode switching control unit 44 switches the traveling mode from the N mode to the B mode on the assumption that the B mode switching request signal Breq is set to the ON state based on the operation of the shift lever 20 from the H position to the B operation position.

When the B mode switching request signal Breq is set to the ON state based on the operation of the shift lever 20 to the B operation switch by the operation position determining unit 40 and the traveling mode is other than the D mode and the N mode, the traveling mode switching control unit 44 rejects switching to the B mode based on the B mode switching request signal Breq set to the ON state and maintains the current traveling mode or switches the traveling mode to the N mode. When the B mode switching request signal Breq is set to the ON state based on the operation of the shift lever 20 to the B operation position by the operation position determining unit 40 and the traveling mode is the N mode but the vehicle 10 is not traveling forward, that is, the vehicle 10 stops or the vehicle 10 is traveling reversely, the traveling mode switching control unit 44 prohibits (rejects) switching to the B mode based on the B mode switching request signal Breq set to the ON state. Then, the traveling mode switching control unit 44 maintains the current traveling mode or switches the traveling mode to the N mode.

Figure 3:
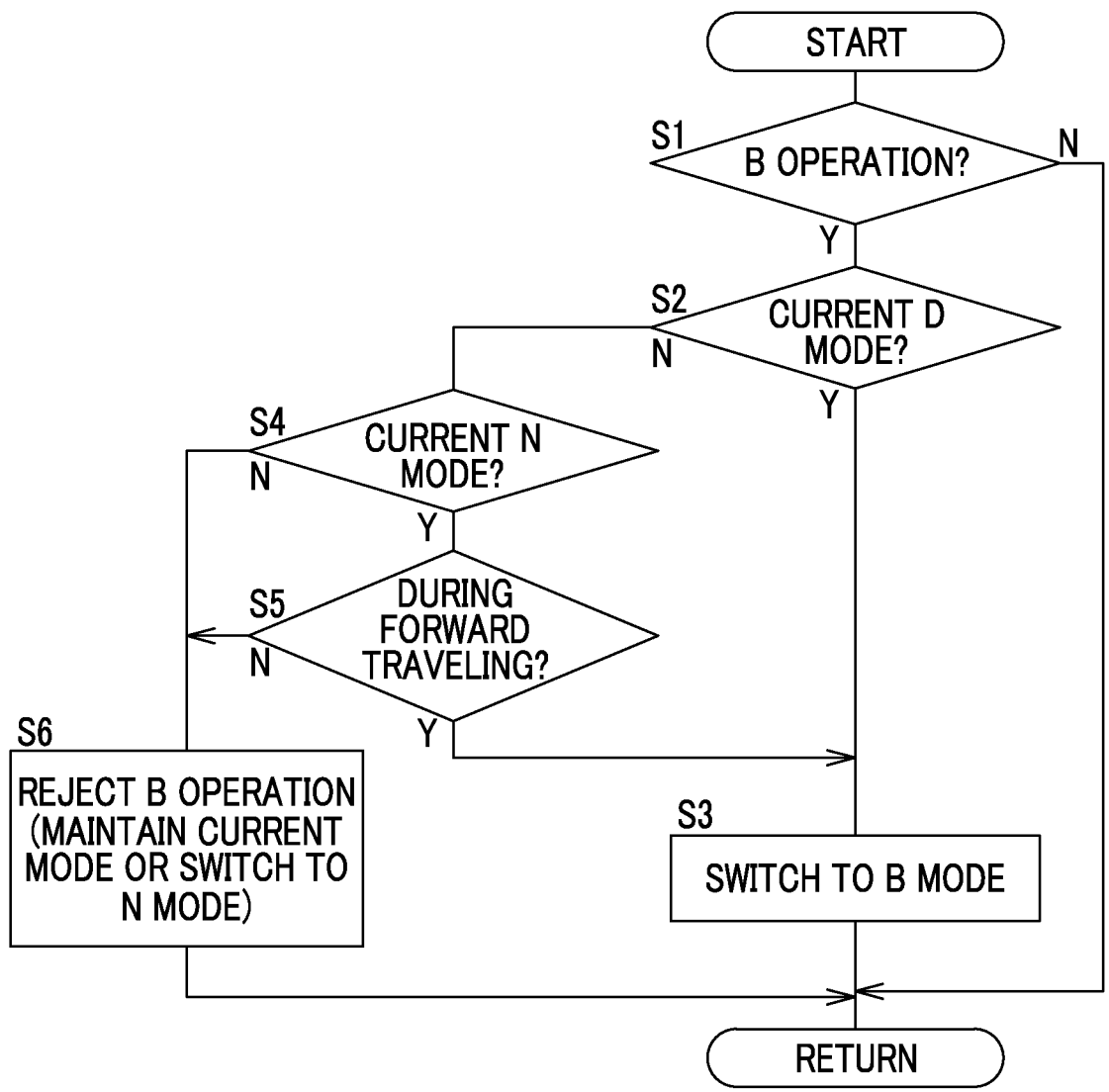
FIG. 3 is a flowchart illustrating principal parts of a control operation when the shift lever of the electronic control unit is operated to a B operation position.

FIG. 3 is a flowchart illustrating principal parts of the control operation when the shift lever 20 of the electronic control unit 18 is operated to the B operation position. In Step (hereinafter, "step" is omitted) S1 corresponding to the function of the operation position determining unit 40, it is determined whether the B mode switching request signal Breq is set to the ON state based on the operation of maintaining the shift lever 20 at the B operation position for the predetermined operation position recognition time T or more. When the determination result of S1 is NO, the flowchart ends. When the determination result of S1 is YES, it is determined whether the current traveling mode is the D mode in S2 corresponding to the function of the traveling mode determining unit 42. When the determination result of S2 is YES, that is, when the traveling mode is the D mode, the traveling mode is switched from the D mode to the B mode in S3 corresponding to the function of the traveling mode switching control unit 44. After S3 is performed, the flowchart ends. On the other hand, when the determination result of S2 is NO, that is, when the traveling mode is other than the D mode, it is determined whether the current traveling mode is the N mode in S4 corresponding to the function of the traveling mode determining unit 42. When the determination result of S4 is YES, that is, when the traveling mode is the N mode, it is determined whether the vehicle 10 is traveling forward in S5 corresponding to the function of the forward traveling determining unit 46. When the determination result of S5 is YES, that is, when the vehicle 10 is traveling forward, the traveling mode is switched from the N mode to the B mode in S3. When the determination result of S4 is NO, that is, when the current traveling mode is other than the D mode and the N mode, and when the determination result of S5 is NO, that is, when the vehicle 10 is not traveling forward, the switching to the B mode based on the B mode switching request signal Breq set to the On state by the operation of maintaining the shift lever 20 at the B operation position for the predetermined operation position recognition time T or more is rejected in S6 corresponding to the function of the traveling mode switching control unit 44. The current traveling mode is maintained or the traveling mode is switched to the N mode. After S6 is performed, the flowchart ends.

Figure 4:
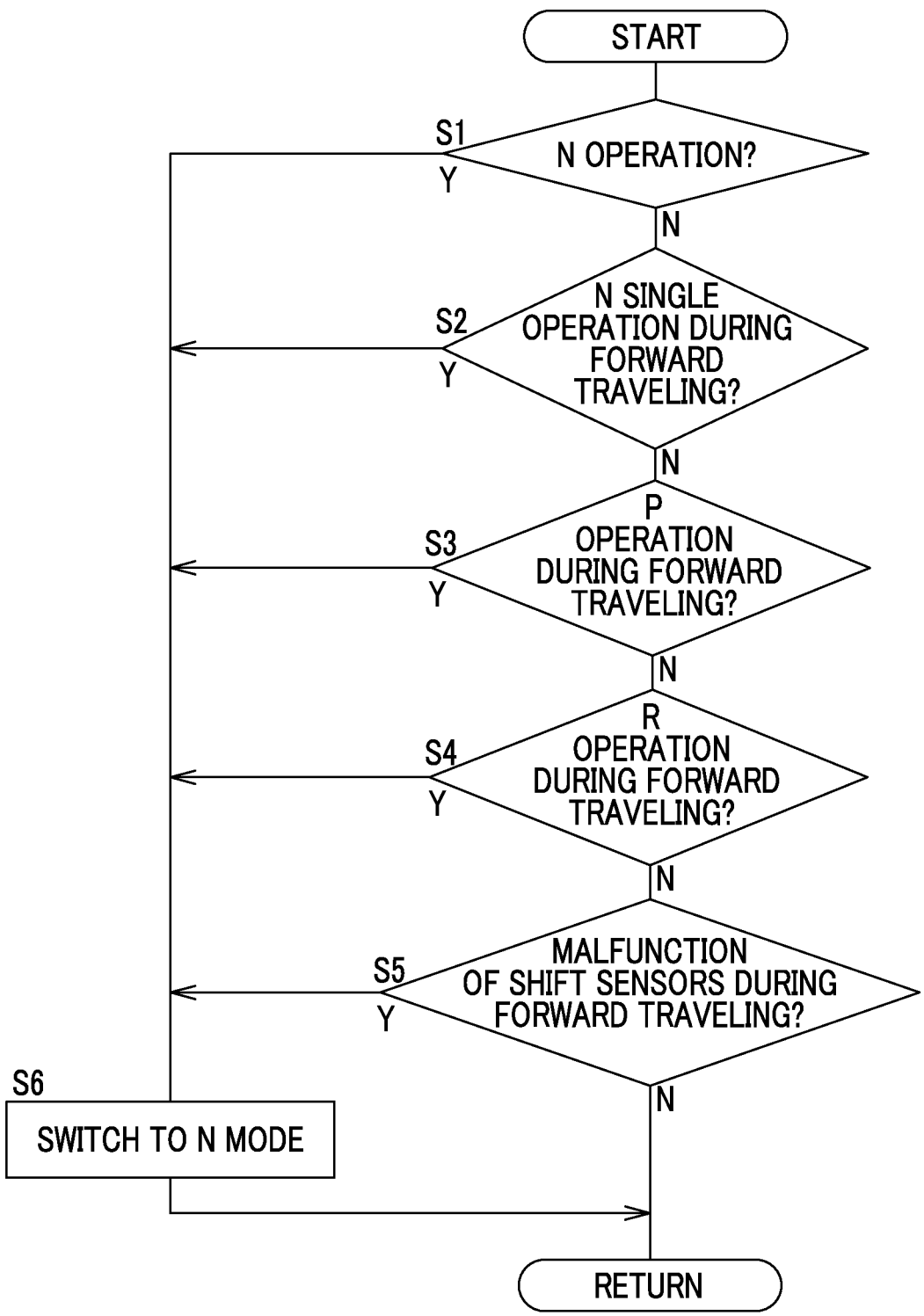
FIG. 4 is a flowchart illustrating principal parts of a control operation of switching a traveling mode from a D mode to an N mode during forward traveling of the vehicle as a control operation of the electronic control unit illustrated in FIG. 1.

FIG. 4 is a flowchart illustrating principal parts of the control operation of switching the traveling mode from the D mode to the N mode in the electronic control unit 18 while the vehicle 10 is traveling forward.

In S1 corresponding to the function of the neutral mode switching determining unit 48 in FIG. 4, it is determined whether the traveling mode is switched to the N mode based on whether the N mode switching request signal Nreq is set to the ON state by the normal operation of maintaining the shift lever 20 at the N operation position for the first N operation position recognition time Tn1 or more. When the determination result of S1 is NO, in S2 corresponding to the function of the neutral mode switching determining unit 48, the shift lever 20 is operated from the initial position to the N operation position, for example, while the vehicle is traveling forward in the D mode, is maintained at the N operation position for the second N operation position recognition time Tn2, and then it is determined whether the traveling mode is switched to the N mode based on whether the N mode switching request signal Nreq is set to the ON state by the single operation of the shift lever 20, which is returned from the N operation position to the H position, to the N operation position. When the determination result of S2 is NO, it is determined whether the traveling mode is switched to the N mode, for example, by prohibiting switching to the P mode based on the operation of the P switch 22 while the vehicle is traveling forward in the D mode in S3 corresponding to the function of the neutral mode switching determining unit 48. When the determination result of S3 is NO, it is determined whether the traveling mode is switched to the N mode, for example, by prohibiting switching to the R mode based on the operation of maintaining the shift lever 20 at the R operation position for the predetermined operation position recognition time T or more while the vehicle is traveling forward in the D mode in S4 corresponding to the function of the neutral mode switching determining unit 48. When the determination result of the S4 is NO, it is determined whether the traveling mode is switched to the N mode, for example, based on the abnormality (failure, malfunction) of the vehicle driving control system (shift sensor systems such as the shift sensor 34 and/or the selection sensor 36, and the electronic control unit 18) while the vehicle is traveling forward in the D mode in S5 corresponding to the function of the neutral mode switching determining unit 48. When the determination result of S5 is NO, the flowchart ends. On the other hand, when the determination results of S1 to S5 are YES, that is, when it is determined that the traveling mode is switched to the N mode, the traveling mode of the vehicle 10 is switched from the D mode to the N mode in S6 corresponding to the function of the traveling mode switching control unit 44. After S6 is performed, the flowchart ends.

Figure 5:
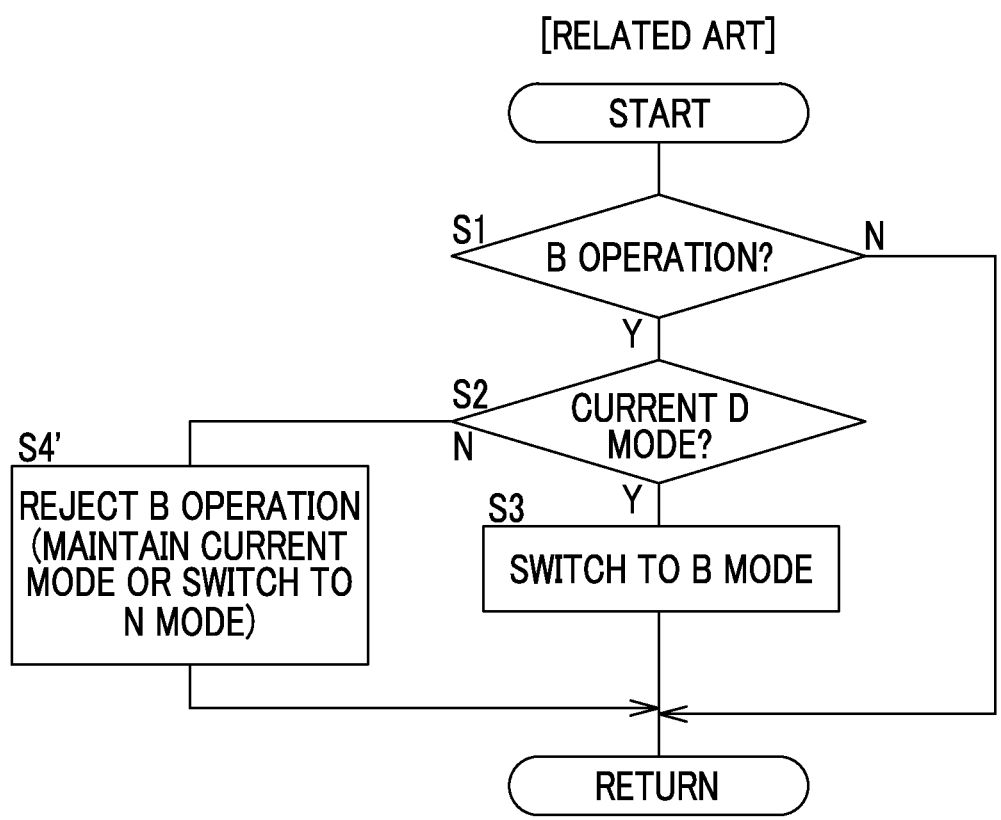
FIG. 5 is a flowchart illustrating principal parts of a control operation when the shift lever of the electronic control unit is operated to the B operation position in a comparative example and corresponding to FIG. 3.

A control operation of an electronic control unit when an electronic control unit according to a comparative example instead of the electronic control unit 18 is applied to the vehicle 10 will be described below with reference to FIG. 5. FIG. 5 is a flowchart illustrating the control operation when the shift lever 20 of the electronic control unit according to the comparative example is operated to the B operation position and corresponding to FIG. 3. The control operation when the shift lever 20 of the electronic control unit according to the comparative example is operated to the B operation position is common to the control operation of S1 to S3 of the electronic control unit 18 illustrated in FIG. 3. The control operation of the electronic control unit according to the comparative example different from the control operation of the electronic control unit 18 will be described below.

In FIG. 5, when the determination result of S1 corresponding to the function of the operation position determining unit is YES, that is, when the operation of maintaining the shift lever 20 at the B operation position for the predetermined operation position recognition time T or more is performed, and when the determination result of S2 corresponding to the traveling mode determining unit is NO, that is, when the current traveling mode is other than the D mode, switching to the B mode based on the B mode switching request signal Breq is prohibited (rejected) in S4' corresponding to the function of the traveling mode switching control unit 44. In this way, the current traveling mode is maintained or the traveling mode is switched to the N mode. After S4' is performed, the flowchart ends.

As illustrated in FIG. 2, the shift lever 20 is operated to the B operation position by one operation in one direction to the vehicle rear side in the second direction P2 from the H position which is the initial position. In the electronic control unit according to the comparative example, switching to the B mode based on the B mode switching request signal Breq in the traveling mode other than the D mode is rejected. Accordingly, in the comparative example, when the traveling mode is a non-driving mode (the P or N mode) in which transmission of power from the engine 11 to the driving wheels is intercepted, the switching of the traveling mode to the B mode and unintentional starting of the vehicle 10 due to an erroneous operation of the shift lever 20 to the B operation position such as a touch of a hand with the shift lever 20 are prevented. However, in the comparative example, for example, while the vehicle 10 is coasting forward in the N mode which is the non-driving mode, switching to the B mode by the operation of the shift lever 20 to the vehicle rear side in the second direction P2 from the H position after switching to the D mode by two types of operation of an operation of the shift lever 20 in the first direction P1 from the H position and an operation of the shift lever 20 to the vehicle rear side in the second direction P2 different from the first direction P1 subsequent thereto is required for switching to the B mode for acquiring a deceleration force stronger than acquired using the engine brake. That is, the operations in total three directions of the shift lever 20 are required. Accordingly, when the traveling mode is switched from the N mode to the B mode while the vehicle 10 is traveling forward, there is a possibility that a driver may experience difficulty in operating the shift lever 20.

As described above, the electronic control unit 18 according to the first embodiment includes the traveling mode switching control unit 44 and the forward traveling determining unit 46. The traveling mode switching control unit 44 sets the B mode based on a selecting operation of the shift lever 20 to the B operation position when the D mode based on the selection of the shift lever 20 to the D operation position is set. When the traveling mode of the vehicle 10 (the automatic transmission 13) is the N mode and the selecting operation of the shift lever 20 to the B operation position is performed while the vehicle 10 is traveling forward, the traveling mode switching control unit 44 switches the traveling mode from the N mode to the B mode. The forward traveling determining unit 46 determines whether the vehicle 10 is traveling forward. The shift lever 20 can be operated to the D operation position for switching the traveling mode of the vehicle 10 to the D mode by the operation in the first direction P1 from the H position and the operation in the second direction P2 different from the first direction P1 subsequent thereto. The shift lever 20 can be operated to the B operation position for switching the traveling mode of the vehicle 10 to the B mode by the operation in the second direction P2 different from the first direction P1 from the H position. Accordingly, while the vehicle is coasting forward in the N mode, the traveling mode is switched from the N mode to the B mode by only the operation of the shift lever 20 in one direction in the second direction P2 from the H position to the B operation position without performing an operation of the shift lever 20 to the D operation position requiring the operations in two direction from the H position. Accordingly, when a driver wants to decelerate the vehicle 10 using the engine 11 while the vehicle is coasting forward in the N mode the driver is prevented from experiencing difficulty in operating the shift lever 20 at the time of switching from the N mode to the B mode in comparison with the comparative example illustrated in FIG. 5 in which temporary switching to the D mode is required for switching from the N mode to the B mode.

In the electronic control unit 18 according to the first embodiment, when switching to the P mode based on the operation of the P switch 22 while the vehicle 10 is traveling forward is prohibited or when switching to the SR mode based on the operation of the shift lever 20 to the R operation position while the vehicle 10 is traveling forward is prohibited, the traveling mode switching control unit 44 switches the traveling mode from the D mode to the N mode. Accordingly, while the vehicle 10 is traveling forward when the switching operation to the P mode based on the P switch 22 or the operation of the shift lever 20 to the R operation position is a driver's erroneous operation and the traveling mode is switched from the D mode to the N mode by the erroneous operation, the traveling mode is also switched from the N mode in which transmission of power from the engine 11 to the driving wheels is intercepted to the driving mode in which power is transmitted from the engine 11 to the driving wheels by the operation in one direction of the shift lever 20 to the B operation position, similarly to the operation to the D operation position requiring the operations in two directions of the shift lever 20. Accordingly, it is possible to simplify an operation of returning the traveling mode from the N mode to the driving mode and to early return the traveling mode from the N mode to the driving mode.

In the electronic control unit 18 according to the first embodiment, the traveling mode switching control unit 44 switches the traveling mode from the D mode to the N mode when the vehicle driving control system abnormality determining unit 50 determines that the vehicle driving control system is abnormal (for example, when it is determined that the shift sensor 34 and/or the selection sensor 36 is abnormal or ECU reset occurs in the electronic control unit 18) while the vehicle 10 is traveling forward, and the traveling mode switching control unit 44 switches the traveling mode from the N mode to the B mode on the assumption that the shift lever 20 is operated to the B operation position when the vehicle driving control system abnormality determining unit 50 determines that the vehicle driving control system is returned to a normal state while the vehicle 10 is traveling forward in the N mode to which the traveling mode is switched due to the abnormality of the vehicle driving control system. Accordingly, when the vehicle driving control system is returned to the normal state while the vehicle 10 is traveling forward when the traveling mode is switched from the D mode to the N mode due to the abnormality of the vehicle driving control system, the traveling mode is switched from the N mode which is the non-driving mode to the driving mode by the operation in one direction of the shift lever 20 to the B operation position, similarly to the operation of the shift lever 20 to the D operation position requiring the operations in two directions. Accordingly, it is possible to simplify an operation of returning the traveling mode from the N mode to the driving mode and to early return the traveling mode from the non-driving mode to the driving mode.

In the electronic control unit 18 according to the first embodiment, the traveling mode switching control unit 44 switches the traveling mode to the N mode regardless of traveling of the vehicle 10 when the shift lever 20 is maintained at the N operation position for the first neutral operation position recognition time Tn1 or more, but switches the traveling mode from the D mode to the N mode when the shift lever 20 is operated from the H position to the N operation position while the vehicle 10 is traveling forward, the shift lever 20 is maintained at the N operation position for the second neutral operation position recognition time Tn2 which is a time period shorter than the first neutral operation position recognition time Tn1, and is then operated to the H position. Accordingly, while the vehicle 10 is traveling forward when a driver's single operation of maintaining the shift lever 20 at the N operation position for the second neutral operation position recognition time Tn2 is a driver's erroneous operation and the traveling mode is switched from the D mode to the N mode by the erroneous operation of the shift lever 20, the traveling mode is also switched from the N mode which is a non-driving mode to the driving mode by the operation in one direction of the shift lever 20 to the B operation position, similarly to the operation to the D operation position requiring the operations in two directions of the shift lever 20. Accordingly, it is possible to simplify an operation of returning the traveling mode from the N mode to the driving mode and to early return the traveling mode from the non-driving mode to the driving mode.

Other embodiments of the disclosure will be described below. In the following embodiments, elements substantially common in functions to the first embodiment will be referenced b the same reference signs and detailed description thereof will not be repeated.

Figure 6:
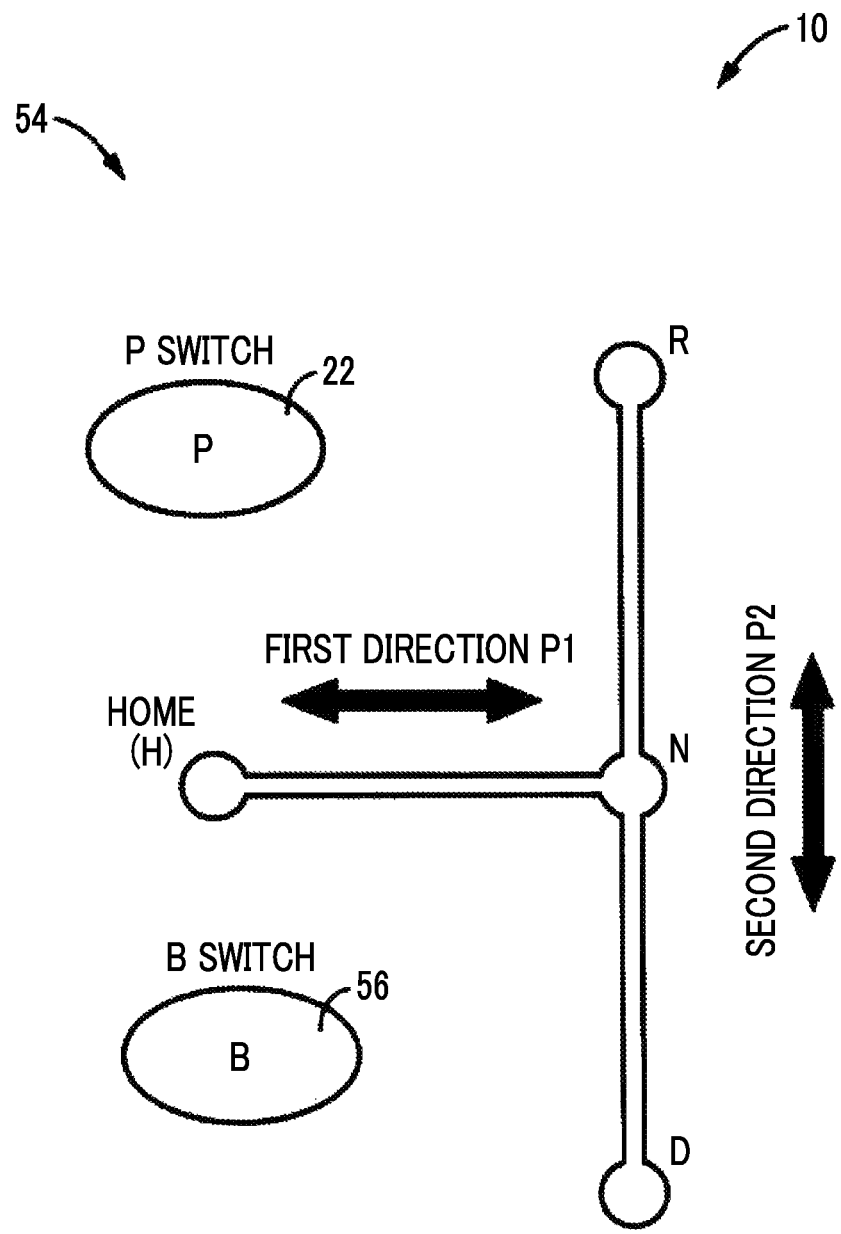
FIG. 6 is a diagram illustrating an example of the shift operating device including a B switch for switching the traveling mode to a deceleration traveling mode.

FIG. 6 is a diagram illustrating operation positions of a shift lever 20 of a shift operating device 54 disposed in the vehicle 10, operation paths between the operation positions, and a P switch 22 and a B switch 56. In a second embodiment of the disclosure, the shift operating device 54 is provided instead of the shift operating device 14 of the vehicle 10 to which the electronic control unit 18 according to the first embodiment is applied. The configuration of the shift operating device 54 is different from that of the shift operating device 14 according to the first embodiment. Differences between the shift operating device 54 and the shift operating device 14 will be described below with reference to FIG. 6.

The shift operating device 54 illustrated in FIG. 6 is a momentary type operating device in which an operating member (a shift lever 20, a P switch 22, and a B switch 56) is returned to an initial position in a state in which an external force is not applied thereto, similarly to the shift operating device 14. As illustrated in FIG. 6, the shift lever 20 are operated to three lever positions Plev including an R operation position, all N operation position, and a D operation position arranged in a front-rear direction or an up-down direction (that is, a longitudinal direction) of the vehicle 10, and a H position. The shift lever 20 can be operated in the longitudinal direction of the vehicle 10 between the R operation position, the N operation position, and the D operation position and can be operated in the transverse direction of the vehicle 10 perpendicular to the longitudinal direction between the H position and the N operation position. The H position is an initial position (a home position) of the shift lever 20. The shift lever 20 is returned to the H position by a mechanical mechanism such as a spring when the shift lever 20 is operated to a lever position Plev (the R, N, or D operation position) other than the H position but an external force applied to the shift lever 20 disappears (that is, when a driver releases the shift lever 20).

Accordingly, the shift lever 20 can be operated to the D operation position for switching the traveling mode to the D mode by an operation in the first direction P1 from the H position and a predetermined operation to the vehicle rear side in the second direction P2 different from the first direction P1 subsequent thereto. The shift lever 20 can be operated to the R operation position for switching the traveling mode to the R mode by an operation in the first direction P1 from the H position and an operation to the vehicle front side in the second direction P2 different from the first direction P1 subsequent thereto, The shift lever 20 can be operated to the N operation position for switching the traveling mode to the N mode by an operation in the first direction P1 from the H position.

The shift operating device 54 includes the B switch 56 for switching the traveling mode to the B mode. The B switch 56 is, for example, an automatic return type push button switch which includes a pressing member functioning as an operating member, an ON/OFF switch that is opened or closed by pressing of the pressing member, and a return spring for returning the pressing member to an original position. The B switch 56 outputs a B switch signal Sbsw to the electronic control unit 18 when the B switch 56 is located at a B operation position (a B operation position, an engine brake operation position) which is a B switch ON position Bsw by a driver's pressing operation. Accordingly, the pressing member of the B switch 56 functions as an example of the operating member that can select the second forward traveling operation position in the disclosure, and the B operation position can be selected when the pressing member is operated to a pressed position.

When it is determined that the B switch 56 is pressed continuously for a predetermined operation position recognition time based on the B switch signal Sbsw based on a driver's operation of the B switch 56, the operation position determining unit 40 of the electronic control unit 18 outputs a switching request to the B mode, that is, a B mode switching request signal Breq set to an ON state, to the traveling mode switching control unit 44.

It is assumed that the traveling mode is the N mode. Then, the traveling mode switching control unit 44 switches the traveling mode from the N mode to the B mode when the B mode switching request signal Breq based on the selecting operation of the B switch 56 to the B operation position is set to the ON state while the vehicle 10 is traveling forward. Accordingly, while the vehicle 10 is traveling forward in the N mode, the traveling mode is switched from the N mode to the B mode by the operation of the B switch 56 without temporarily switching the traveling mode to the D mode by the selecting operation to the D operation position requiring the operations in two directions of an operation of the shift lever 20 in the first direction P1 from the H position and an operation in the second direction P2 different from the first direction P1 subsequent thereto. Even when the traveling mode is switched from the D mode to the N mode regardless of a driver's intention due to a driver's erroneous operation of the shift operating device 54, an abnormality of the vehicle driving control system, and the like, the traveling mode can be returned from the N mode to a state (a driving mode) in which power of the engine 11 is transmitted to the driving wheels by pressing the B switch 56, similarly to the operation of the shift lever 20 to the D operation position requiring the operations in two directions.

Figure 7:
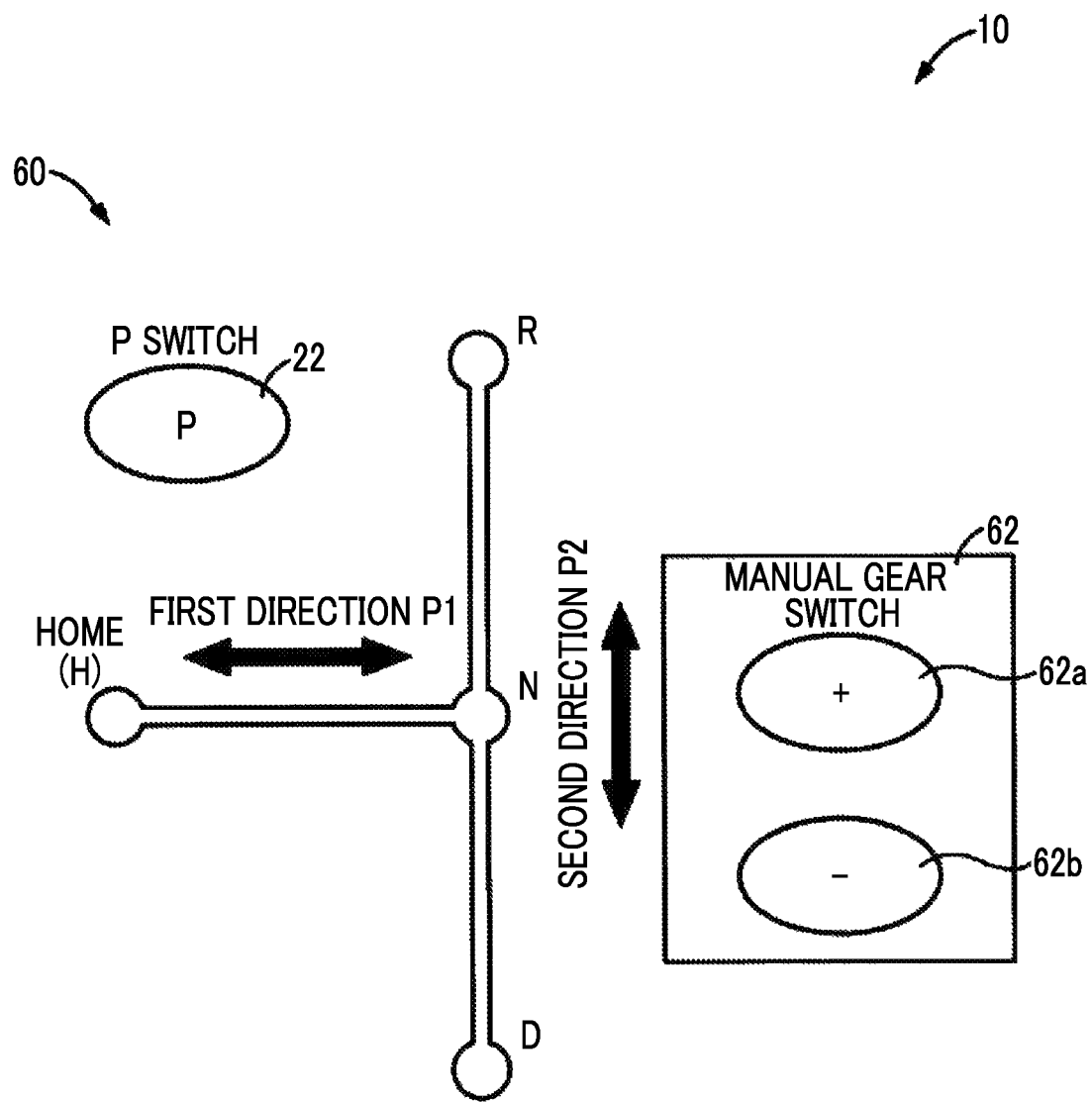
FIG. 7 is a diagram illustrating an example of the shift operating device including a manual gear switch including a +(plus) button switch and a (minus) button switch.

FIG. 7 is a diagram illustrating operation positions of a shift lever 20 of a shift operating device 60 disposed in the vehicle 10 and operation paths between the operation positions. FIG. 7 is a diagram illustrating a manual gear switch 62 including a P switch 22, a + button switch 62a, and a − button switch 62b. In a third embodiment of the disclosure, the shift operating device 60 is provided instead of the shift operating device 14 of the vehicle 10 to which the electronic control unit 18 according to the first embodiment is applied. The shift operating device 60 includes the manual gear switch 62 instead of the B switch 56 of the shift operating device 54 according to the second embodiment.

The manual gear switch 62 is, for example, a switch for switching to a manual shift mode in which a speed change of the automatic transmission 13 is performed by a driver's operation. Each of the + button switch 62a and the − button switch 62b of the manual gear switch 62 is, for example, an automatic return type push button switch which includes a pressing member functioning as an operating member, an ON/OFF switch that is opened or closed by pressing of the pressing member, and a return spring for returning the pressing member to an original position. The manual gear switch 62 outputs a manual gear switch (+) signal and a manual gear switch (−) signal to the electronic control unit 18 when it is pressed by a driver.

When it is determined that the + button switch 62a or the − button switch 62b is operated continuously for a predetermined operation position recognition time or more by a driver based on the manual gear switch (+) signal or the manual gear switch (−) signal, the operation position determining unit 40 determines that an upshift request in the manual shift mode is issued by the driver or that a downshift request is issued by the driver. Here, since switching from the N mode to the manual shift mode corresponds to switching to the deceleration traveling mode in which deceleration based on an engine brake is applied to the vehicle 10, the pressing member of each of the + button switch 62a and the − button switch 62b of the manual gear switch 62 functions as an example of the operating member that can select the second forward traveling operation position in the disclosure. When the pressing member is operated to a pressed position, a manual shift operation position in which the manual shift mode which is an example of the second forward traveling mode in the disclosure is set can be selected.

The traveling mode switching control unit 44 switches the traveling mode from the D mode to the manual shift mode based on the upshift request or the downshift request from the driver in the manual shift mode based on the operation of the + (plus) button switch 62a or the − (minus) button switch 62b in the D mode. When the operation position determining unit 40 determines that a switching request to the manual shift mode based on the operation of the + (plus) button switch 62a or the − (minus) button switch 62b is issued while the traveling mode is the N mode and the vehicle 10 is traveling forward, the traveling mode switching control unit 44 switches the traveling mode from the N mode to the manual shift mode. Accordingly, while the vehicle 10 is traveling forward in the N mode, the traveling mode is switched to the manual shift mode by the operation of the + (plus) button switch 62a or the − (minus) button switch 62b without being temporarily switched to the D mode. Accordingly, when the driver wants to decelerate the vehicle 10 using an engine brake during forward coast traveling in the N mode, it is possible to prevent the driver from experiencing difficulty in operating the shift operating device 60, Even when the traveling mode is switched to the N mode regardless of the driver's intention due to a driver's erroneous operation of the shift operating device 60, an abnormality of the vehicle driving control system, and the like, the traveling mode can be returned from the N mode to the state (the driving mode) in which power of the engine 11 is transmitted to the driving wheels by the pressing operation of the + (plus) button switch 62a or the − (minus) button switch 62b, similarly to the operation of the shift lever 20 to the D operation position requiring operations in two directions.

Figure 8:
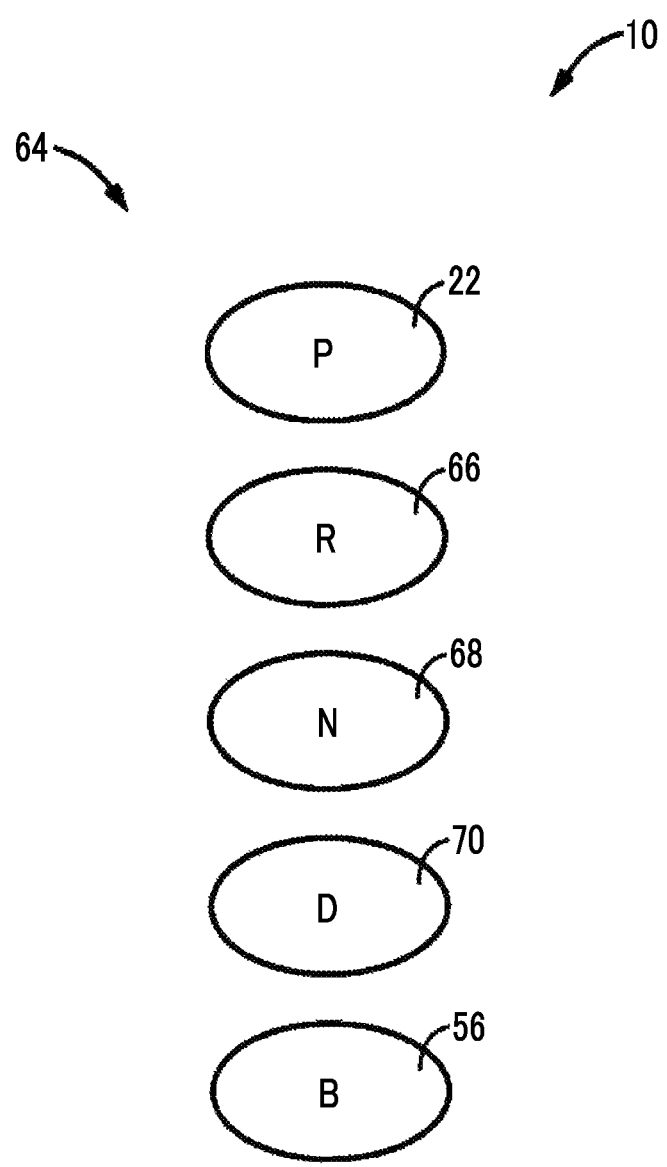
FIG. 8 is a diagram illustrating an example of the shift operating device including a plurality of switches for switching the traveling mode to various traveling modes.

FIG. 8 is a diagram illustrating a shift operating device 64 disposed in a vehicle 10. In a fourth embodiment of the disclosure, the shift operating device 64 is provided instead of the shift operating device 14 of the vehicle 10 to which the electronic control unit 18 according to the first embodiment is applied. The shift operating device 64 includes a P switch 22, an R switch 66, an N switch 68, a D switch 70, and a B switch 56.

Similarly to the P switch 22 and the B switch 56, each of the R switch 66, the N switch 68, and the D switch 70 is, for example, an automatic return type push button switch which includes a pressing member functioning as an operating member, an ON/OFF switch that is opened or closed by pressing of the pressing member, and a return spring for returning the pressing member to an original position. When an R operation position (an R operation position, a reverse operation position) which is an R switch ON position Rsw is set by a driver's operation, the R switch 66 outputs an R switch signal Srsw to the electronic control unit 18. When an N operation position (an N operation position, a neutral operation position) which is an N switch ON position Nsw is set by a driver's operation, the N switch 68 outputs an N switch signal Snsw to the electronic control unit 18. When a D operation position (a D operation position, a drive operation position) which is a D switch ON position Dsw is set by a driver's operation, the D switch 70 outputs a D switch signal Sdsw to the electronic control unit 18. Accordingly, the pressing member of the D switch 70 functions as an operating member that can select the forward traveling operation position in which the forward traveling mode in the disclosure is set. When the pressing member is operated to the pressed position, the D operation position in which the D mode is set can be selected.

When it is determined that each switch (the R switch 66, the N switch 68, or the D switch 70) is pressed, for example, for a predetermined operation position recognition time or more based on the R switch signal Srsw, the N switch signal Snsw, or the D switch signal Sdsw based on a driver's operation of the R switch 66, the N switch 68, or the D switch 70, the operation position determining unit 40 of the electronic control unit 18 outputs a switching request to each traveling mode (the R mode, the N mode, or the D mode), that is, a traveling mode switching request signal (an R mode switching request signal Rreq, an N mode switching request signal Nreq, or a D mode switching request signal Dreg) set to an ON state, to the traveling mode switching control unit 44.

When the B mode switching request signal Breq based on the operation of the B switch 56 is set to an ON state while the traveling mode is the N mode and the vehicle 10 is traveling forward, the traveling mode switching control unit 44 switches the traveling mode from the N mode to the B mode. Accordingly, while the vehicle 10 is traveling forward in the N mode, the traveling mode is switched from the N mode to the B mode by the operation of the B switch 56 without temporarily switching the traveling mode to the D mode by the operation of the D switch 70. Accordingly, when a driver wants to decelerate the vehicle 10 using an engine brake during forward coast traveling in the N mode, it is possible to prevent the driver from experiencing difficulty in operating the shift operating device 64 at the time of switching the traveling mode from the N mode to the B mode.

While the disclosure has been described above in detail with reference to the drawings, the disclosure can be embodied in another aspect and can be modified in various forms without departing from the gist of the disclosure.

For example, the shift operating device 60 according to the third embodiment illustrated in FIG. 7 includes the + (plus) button switch 62a or the − (minus) button switch 62b, but the disclosure is not limited to this configuration. For example, (i) a pair of paddle shift switches which can be operated with a finger while a driver grasps a steering wheel with both hands and can request an upshift or a downshift by the operation is disposed as an operating member of the shift operating device in the steering wheel, and when the paddle shift switches are operated while (ii) the traveling mode is the N mode and (iii) the vehicle is traveling forward, the traveling mode may be switched from the N mode to a paddle active control mode. The paddle active control mode can apply deceleration based on an engine brake to the vehicle. Even in this case, when a driver wants to decelerate the vehicle using the engine brake during forward coast traveling in the N mode, it is possible to prevent the driver from experiencing difficulty in operating the shift operating device.

In the shift operating device 60 according to the first embodiment, the D operation position at which the D mode is set and the B operation position at which the B mode is set by an operation different from the operation of the operating member to the D operation position can be selected, but the disclosure is not limited to this configuration. For example, a manual shift operation position (an M operation position) at which a manual shift mode (an M mode (range)) in which an upshift or a downshift is possible by a manual operation of the operating member is set may be disposed instead of the B operation position. An S operation position at which a sequential mode (an S mode (range)) in which an engine lower-limit rotation speed which is a lower limit of an engine rotation speed can be stepwise changed by a driver's manual operation is set may be disposed instead of the B operation position. Here, the M mode and the S mode are examples of the second forward traveling mode in the disclosure. The M operation position and the S operation position are examples of the second forward traveling operation position in the disclosure.

The above description is only embodiments. Although not exemplified above, the disclosure can be embodied in aspects having, various modifications or improvements based on knowledge of those skilled in the art without departing from the gist of the disclosure.

What is claimed is:

1. A control system for a vehicle including:
    a shift operating device including an operating member configured to be operated by a driver of the vehicle;
    the shift operating device configured to:
        allow the driver to operate the operating member to select a first forward traveling operation position, the operating member being able to return automatically to an initial position after being operated by the driver; and
        allow the driver to operate the operating member to select a second forward traveling operation position that is different from the first forward traveling operation position; and
    an electronic control unit configured to:
        set a first forward traveling mode for the vehicle based on the driver's operation of the operating member to select the first forward traveling operation position;
        determine whether the vehicle is traveling forward;
        determine whether a traveling mode of the vehicle is a neutral mode;
        switch the traveling mode of the vehicle from the neutral mode to a second forward traveling mode in response to determining that the driver operates the operating member to select the second forward traveling operation position while the traveling mode of the vehicle is the neutral mode and the vehicle is traveling forward.

2. The control system for the vehicle according to claim 1, wherein:
    the operating member is a shift lever, and the operating member is configured to:
        allow the driver to move the shift lever to the first forward traveling operation position for switching the traveling mode of the vehicle to the first forward traveling mode by (i) first moving the shift lever in a first direction from the initial position and (ii) subsequently moving the shift lever in a second direction different from the first direction; and
        allow the driver to move the shift lever to the second forward traveling operation position for switching the traveling mode of the vehicle to the second forward traveling mode by moving the shift lever in the second direction from the initial position.

3. The control system for the vehicle according to claim 2, wherein
    the electronic control unit is configured to:
        set a parking mode for the vehicle based on an operation of a parking switch in the vehicle;
        set a reverse traveling mode for the vehicle based on an operation of the shift lever to a reverse traveling operation position; and
        switch the traveling mode of the vehicle from the first forward traveling mode to the neutral mode in response to determining that switching to the parking mode is prohibited during forward traveling of the vehicle or switching to the reverse traveling mode is prohibited during forward traveling of the vehicle.

4. The control system for the vehicle according to claim 2, wherein
    the electronic control unit is configured to:
        switch the traveling mode of the vehicle from the first forward traveling mode to the neutral mode, in response to determining that a vehicle driving control system is in an abnormal state during forward traveling of the vehicle; and
        switch the traveling mode of the vehicle from the neutral mode to the second forward traveling mode in response to determining that the vehicle driving control system is returned to a normal state from the abnormal state while the vehicle is traveling forward in the neutral mode.

5. The control system for the vehicle according to claim 2, wherein
    the electronic control unit is configured to:
        switch the traveling mode of the vehicle to the neutral mode regardless of traveling of the vehicle, in response to determining that the shift lever is maintained at a neutral operation position for a first neutral operation position recognition time or more; and
        switch the traveling mode of the vehicle from the first forward traveling mode to the neutral mode, in response to determining that: (i) the shift lever is operated from the initial position to the neutral operation position during forward traveling of the vehicle, (ii) the shift lever is maintained at the neutral operation position for a second neutral operation position recognition time which is shorter than the first neutral operation position recognition time, and (iii) then the shift lever is operated to the initial position.

* * * * *